US008768691B2

(12) United States Patent
Yoshida

(10) Patent No.: US 8,768,691 B2
(45) Date of Patent: Jul. 1, 2014

(54) SOUND ENCODING DEVICE AND SOUND ENCODING METHOD

(75) Inventor: Koji Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1678 days.

(21) Appl. No.: 11/909,556

(22) PCT Filed: Mar. 23, 2006

(86) PCT No.: PCT/JP2006/305871
§ 371 (c)(1), (2), (4) Date: Sep. 24, 2007

(87) PCT Pub. No.: WO2006/104017
PCT Pub. Date: Oct. 5, 2006

(65) Prior Publication Data

US 2009/0055172 A1 Feb. 26, 2009

(30) Foreign Application Priority Data

Mar. 25, 2005 (JP) ................................. 2005-088808

(51) Int. Cl.

| | |
|---|---|
| ***G10L 21/00*** | (2013.01) |
| ***G10L 19/12*** | (2013.01) |
| ***G10L 25/00*** | (2013.01) |
| ***G10L 19/00*** | (2013.01) |
| ***G06F 15/00*** | (2006.01) |
| ***G10L 13/00*** | (2006.01) |
| ***G10L 21/04*** | (2013.01) |

(52) U.S. Cl.
USPC ........... 704/223; 704/220; 704/222; 704/258; 704/200; 704/200.1; 704/201; 704/205; 704/211; 704/230; 704/500; 704/501; 704/502; 704/503; 704/504; 381/20; 381/21; 381/22; 381/23

(58) Field of Classification Search
USPC ................................. 704/201, 225, 230, 500
See application file for complete search history.

(56) References Cited

U.S. PATENT DOCUMENTS

| | | | | |
|---|---|---|---|---|
| 4,229,820 | A * | 10/1980 | Enomoto | 375/245 |
| 7,602,922 | B2 * | 10/2009 | Breebaart et al. | 381/23 |

(Continued)

FOREIGN PATENT DOCUMENTS

| | | |
|---|---|---|
| JP | 2004509365 | 3/2004 |
| WO | 03/090208 | 10/2003 |
| WO | WO 03090208 A1 * | 10/2003 |

OTHER PUBLICATIONS

Liebchen, "Lossless audio coding using adaptive multichannel prediction," in Proc. 113th AES Convention, Los Angeles, Calif, USA, Oct. 2002, pp. 1-7.*

(Continued)

*Primary Examiner* — Richemond Dorvil
*Assistant Examiner* — Olujimi Adesanya
(74) *Attorney, Agent, or Firm* — Greenblum & Bernstein, P.L.C.

(57) ABSTRACT

A sound encoder for efficiently encoding stereophonic sound. A prediction parameter analyzer determines a delay difference D and an amplitude ratio g of a first-channel sound signal with respect to a second-channel sound signal as channel-to-channel prediction parameters from a first-channel decoded signal and a second-channel sound signal. A prediction parameter quantizer quantizes the prediction parameters, and a signal predictor predicts a second-channel signal using the first decoded signal and the quantization prediction parameters. The prediction parameter quantizer encodes and quantizes the prediction parameters (the delay difference D and the amplitude ratio g) using a relationship (correlation) between the delay difference D and the amplitude ratio g attributed to a spatial characteristic (e.g., distance) from a sound source of the signal to a receiving point.

13 Claims, 11 Drawing Sheets

(56) References Cited

U.S. PATENT DOCUMENTS

| | | | | |
|---|---|---|---|---|
| 7,848,932 | B2 * | 12/2010 | Goto et al. | 704/500 |
| 7,974,847 | B2 * | 7/2011 | Kjoerling et al. | 704/500 |
| 2004/0044524 | A1 | 3/2004 | Minde et al. | |
| 2005/0075872 | A1 * | 4/2005 | Kikuiri et al. | 704/230 |
| 2005/0177360 | A1 * | 8/2005 | Schuijers et al. | 704/201 |
| 2006/0004583 | A1 * | 1/2006 | Herre et al. | 704/500 |
| 2006/0015330 | A1 * | 1/2006 | Kim | 704/219 |
| 2006/0083385 | A1 * | 4/2006 | Allamanche et al. | 381/23 |
| 2006/0190247 | A1 * | 8/2006 | Lindblom | 704/230 |
| 2006/0233379 | A1 * | 10/2006 | Villemoes et al. | 381/23 |
| 2007/0016416 | A1 * | 1/2007 | Roden et al. | 704/230 |
| 2007/0160236 | A1 * | 7/2007 | Iida et al. | 381/119 |
| 2007/0179780 | A1 | 8/2007 | Yamanashi et al. | |
| 2008/0170711 | A1 | 7/2008 | Breebaart et al. | |
| 2009/0028240 | A1 * | 1/2009 | Huang et al. | 375/240.12 |
| 2009/0287495 | A1 | 11/2009 | Breebaart et al. | |

OTHER PUBLICATIONS

Fuchs, H, "Improving joint stereo audio coding by adaptive inter-channel prediction," Applications of Signal Processing to Audio and Acoustics, 1993. Final Program and Paper Summaries., 1993 IEEE Workshop on , vol., no., pp. 39-42, Oct. 17-20, 1993.*

Goto et al, "A Study of Scalable Stereo Speech Coding for Speech Communications", Aug. 22, 2005, FIT 2005, No. 4, pp. 299-300 and partial English Translation pp. 3-6.*

Yoshida et al, "A Preliminary Study of Inter-Channel Prediction for Scalable Stereo Speech Coding", IEICE 2005, D 14-1, Mar. 7, 2005, pp. 118 and partial English Translation pp. 2-3.*

Kamamoto et al, "Lossless Compression of Multi-Channel Signals Using Inter-Channel Correlation", FIT 2004, Aug. 20 2004, pp. 123-124 and partial translation pp. 3-6.*

Grill et al, "Scalable joint stereo coding," in Proc. 105th Conv. Aud. Eng. Soc., Sep. 1998, pp. 1-15.*

Biswas et al, "Stability of the stereo linear prediction schemes," ELMAR, 2005. 47th International Symposium , vol., no., pp. 221-224, Jun. 8-10, 2005.*

A. Aggarwal, "Optimal prediction inscalable coding of stereophonic audio," in Proc. 109th AES Conv., Los Angeles, CA, 2000, pp. 1-10.*

Roman et al., "Location-based sound segregation", 2002 IEEE International Conference on Acoustics, Speech, and Signal Processing, Procesings. (ICASSP). Orland, FL, May 13-17, 2002 [IEEE International Conference on Acoustics, Speech, and Signal Processing (ICASSP)], New York, NY : IEEE, US, vol. 1 , May 13, 2002, pp. I-1013; XP010804825.

Brungart et al., "Control of perceived distance in virtual audio displays", Engineering in Medicine and Biology Society, 1998. Processings of the 20th Annual International Conference of the IEEE, IEEE—Piscataway, NJ, US, vol. 3 , Oct. 29, 1998, pp. 1101-1104; XP010320208.

Duda, "Modeling head related transfer functions", Signals, Systems and Computers, 1993. 1993 Conference Record of the Twenty-Seventh Asilomar Conference on Pacific Grove, CA, USA Nov. 1-3, 1993, Los Alamitos, CA, USA, IEEE Comput. Soc , Nov. 1, 1993, pp. 996-1000; XP10096251.

Baumgarte et al., "Binaural cue coding-part I: psychoacoustic fundamentals and design principles", IEEE Transactions on Speech and Audio Processing, IEEE Service Center, New York, NY, US, vol. 11, No. 6, Nov. 1, 2003, pp. 509-519; XP011104738.

Ebara et al., "Shosu Pulse Kudo Ongen O Mochiiru Tei-Bit Rate Onsei Fugoka Hoshiki no Hinshitsu Kaizen", IEICE Technical Report, SP99-74, vol. 99 No. 299, pp. 15 to 21, Sep. 16, 1999.

Ramprashad, "Stereophonic CELP coding using cross channel prediction", Proc. IEEE Workshop on Speech Coding, pp. 136-138, Sep. 2000.

* cited by examiner

SOUND ENCODING DEVICE AND SOUND ENCODING METHOD

TECHNICAL FIELD

The present invention relates to a speech coding apparatus and a speech coding method. More particularly, the present invention relates to a speech coding apparatus and a speech coding method for stereo speech.

BACKGROUND ART

As broadband transmission in mobile communication and IP communication has become the norm and services in such communications have diversified, high sound quality of and higher-fidelity speech communication is demanded. For example, from now on, communication in a hands-free video phone service, speech communication in video conferencing, multi-point speech communication where a number of callers hold a conversation simultaneously at a number of different locations and speech communication capable of transmitting background sound without losing high-fidelity will be expected to be demanded. In this case, it is preferred to implement speech communication by a stereo signal that has higher-fidelity than using monaural signals and that makes it possible to identify the locations of a plurality of calling parties. To implement speech communication using a stereo signal, stereo speech encoding is essential.

Further, to implement traffic control and multicast communication over a network in speech data communication over an IP network, speech encoding employing a scalable configuration is preferred. A scalable configuration includes a configuration capable of decoding speech data on the receiving side even from partial coded data.

Even when encoding stereo speech, it is preferable to implement encoding a monaural-stereo scalable configuration where it is possible to select decoding a stereo signal or decoding a monaural signal using part of coded data on the receiving side.

Speech coding methods employing a monaural-stereo scalable configuration include, for example, predicting signals between channels (abbreviated appropriately as "ch") (predicting a second channel signal from a first channel signal or predicting the first channel signal from the second channel signal) using pitch prediction between channels, that is, performing encoding utilizing correlation between 2 channels (see Non-Patent Document 1).

Non-Patent Document 1: Ramprashad, S. A., "Stereophonic CELP coding using cross channel prediction", Proc. IEEE Workshop on Speech Coding, pp. 136-138, September 2000.

DISCLOSURE OF INVENTION

Problems to be Solved by the Invention

However, the speech coding method disclosed in above Non-Patent Document 1 separately encodes inter-channel prediction parameters (delay and gain of inter-channel pitch prediction) between channels and therefore coding efficiency is not high.

It is an object of the present invention to provide a speech coding apparatus and a speech coding method that enable efficient coding of stereo signals.

Means for Solving the Problem

The speech coding apparatus according to the present invention employs a configuration including: a prediction parameter analyzing section that calculates a delay difference and an amplitude ratio between a first signal and a second signal as prediction parameters; and a quantizing section that calculates quantized prediction parameters from the prediction parameters based on a correlation between the delay difference and the amplitude ratio.

Advantageous Effect of the Invention

The present invention enables efficient coding of stereo speech.

BEST MODE FOR CARRYING OUT THE INVENTION

Embodiments of the present invention will be described in detail with reference to the accompanying drawings.

Embodiment 1

Figure 1:
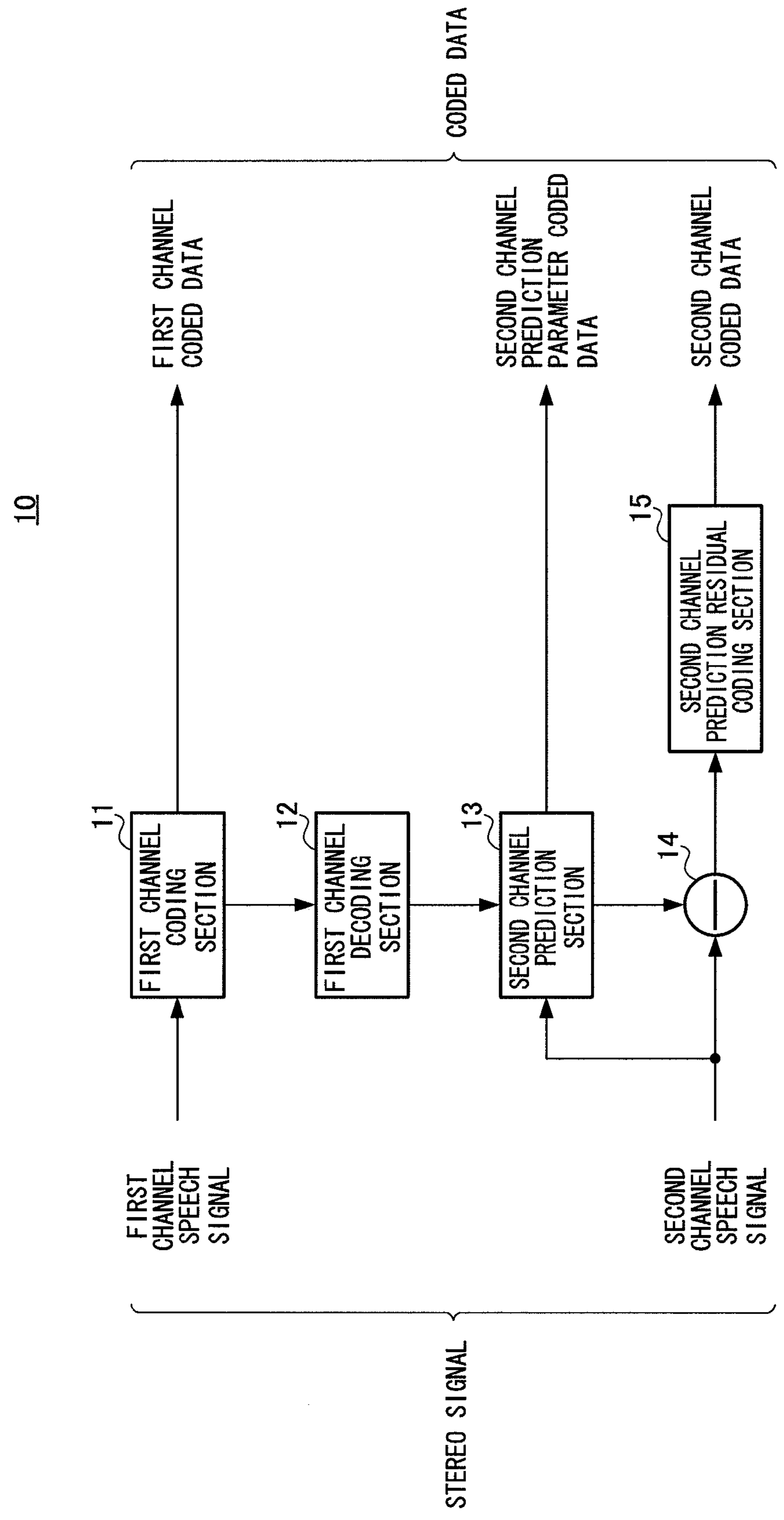
FIG. 1 is a block diagram showing a configuration of the speech coding apparatus according to Embodiment 1.

FIG. 1 shows a configuration of the speech coding apparatus according to the present embodiment. Speech coding apparatus 10 shown in FIG. 1 has first channel coding section 11, first channel decoding section 12, second channel prediction section 13, subtractor 14 and second channel prediction residual coding section 15. In the following description, a description is given assuming operation in frame units.

First channel coding section 11 encodes a first channel speech signal s_ch1($n$) (where n is between 0 and NF−1 and NF is the frame length) of an input stereo signal, and outputs coded data (first channel coded data) for the first channel speech signal to first channel decoding section 12. Further, this first channel coded data is multiplexed with second channel prediction parameter coded data and second channel coded data, and transmitted to a speech decoding apparatus (not shown).

First channel decoding section 12 generates a first channel decoded signal from the first channel coded data, and outputs the result to second channel prediction section 13.

Second channel prediction section 13 calculates second channel prediction parameters from the first channel decoded signal and a second channel speech signal s_ch2($n$) (where n is between 0 and NF−1 and NF is the frame length) of the input stereo signal, and outputs second channel prediction parameter coded data, that is the second channel prediction parameters subjected to encoding. This second prediction parameter coded data is multiplexed with other coded data, and transmitted to the speech decoding apparatus (not shown). Second channel prediction section 13 synthesizes a second channel predicted signal sp_ch2($n$) from the first channel decoded signal and the second channel speech signal, and outputs the second channel predicted signal to subtractor 14. Second channel prediction section 13 will be described in detail later.

Subtractor 14 calculates the difference between the second channel speech signal s_ch2($n$) and the second channel predicted signal sp_ch2($n$), that is, the signal (second channel prediction residual signal) of the residual component of the second channel predicted signal with respect to the second channel speech signal, and outputs the difference to second channel prediction residual coding section 15.

Second channel prediction residual coding section 15 encodes the second channel prediction residual signal and outputs second channel coded data. This second channel coded data is multiplexed with other coded data and transmitted to the speech decoding apparatus.

Figure 2:
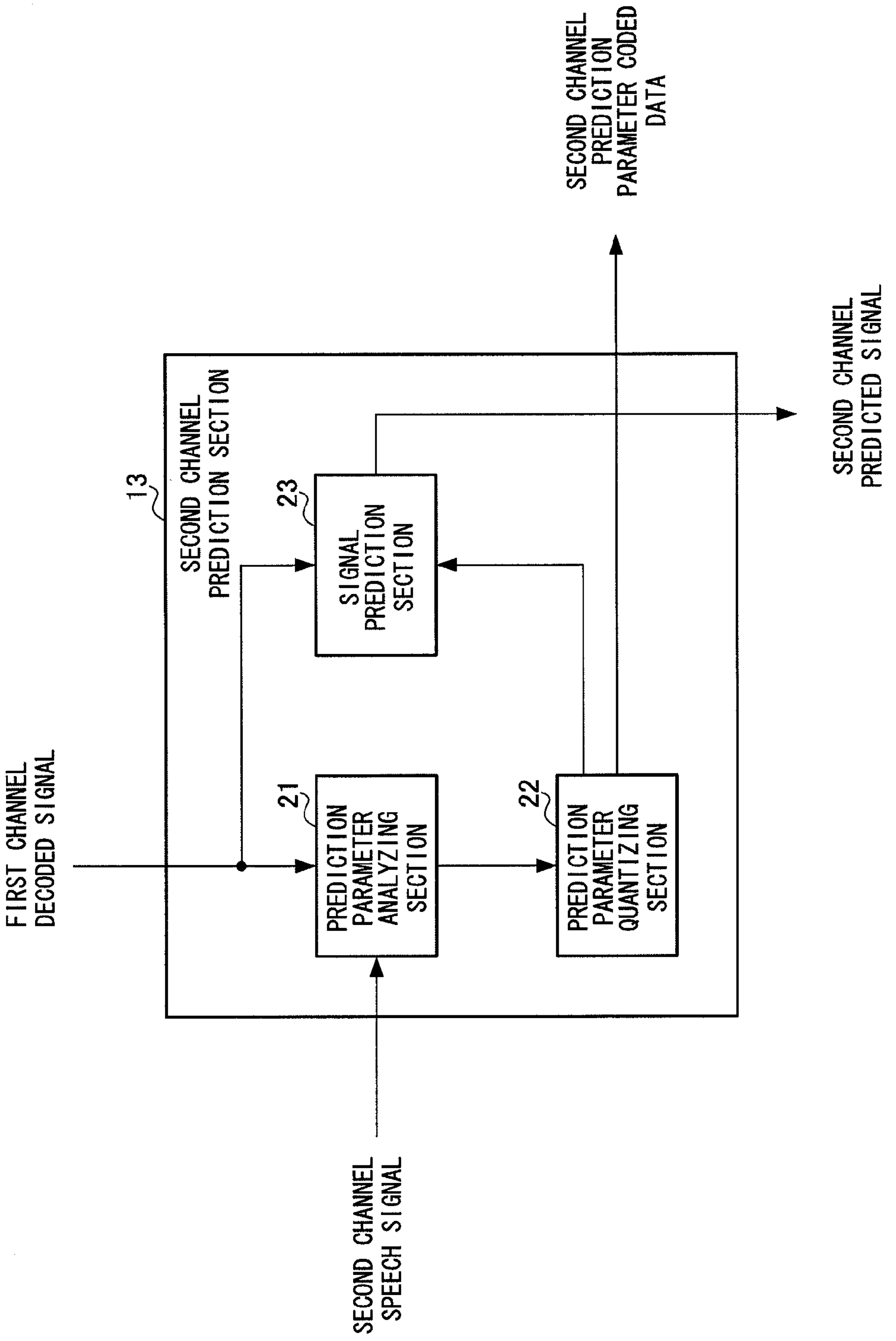
FIG. 2 is a block diagram showing a configuration of the second channel prediction section according to Embodiment 1.

Next, second channel prediction section 13 will be described in detail. FIG. 2 shows the configuration of second channel prediction section 13. As shown in FIG. 2, second channel prediction section 13 has prediction parameter analyzing section 21, prediction parameter quantizing section 22 and signal prediction section 23.

Based on the correlation between the channel signals of the stereo signal, second channel prediction section 13 predicts the second channel speech signal from the first channel speech signal using parameters based on delay difference D and amplitude ratio g of the second channel speech signal with respect to the first channel speech signal.

From the first channel decoded signal and the second channel speech signal, prediction parameter analyzing section 21 calculates delay difference D and amplitude ratio g of the second channel speech signal with respect to the first channel speech signal as inter-channel prediction parameters and outputs the inter-channel prediction parameters to prediction parameter quantizing section 22.

Prediction parameter quantizing section 22 quantizes the inputted prediction parameters (delay difference D and amplitude ratio g) and outputs quantized prediction parameters and second channel prediction parameter coded data. The quantized prediction parameters are inputted to signal prediction section 23. Prediction parameter quantizing section 22 will be described in detail later.

Signal prediction section 23 predicts the second channel signal using the first channel decoded signal and the quantized prediction parameters, and outputs the predicted signal. The second channel predicted signal sp_ch2($n$) (where n is between 0 and NF−1 and NF is the frame length) predicted at signal prediction section 23 is expressed by following equation 1 using the first channel decoded signal sd_ch1($n$).

[1]

$$sp\_ch2(n)=g\cdot sd\_ch1(n-D) \quad \text{(Equation 1)}$$

Further, prediction parameter analyzing section 21 calculates the prediction parameters (delay difference D and amplitude ratio g) that minimize the distortion "Dist" expressed by equation 2, that is, the distortion Dist between the second channel speech signal s_ch2($n$) and the second channel predicted signal sp_ch2($n$). Prediction parameter analyzing section 21 may calculate as the prediction parameters, delay difference D that maximizes correlation between the second channel speech signal and the first channel decoded signal and average amplitude ratio g in frame units.

[2]

$$Dist=\sum_{n=0}^{NF-1}\{\mathrm{s\_ch2}(n)-\mathrm{sp\_ch2}(n)\}^2 \quad \text{(Equation 2)}$$

Next, prediction parameter quantizing section 22 will be described in detail.

Between delay difference D and amplitude ratio g calculated at prediction parameter analyzing section 21, there is a relationship (correlation) resulting from spatial characteristics (for example, distance) from the source of a signal to the receiving point. That is, there is a relationship that when delay difference D (>0) becomes greater (greater in the positive direction (delay direction)), amplitude ratio g becomes smaller (<1.0), and, on the other hand, when delay difference D (<0) becomes smaller (greater in the negative direction (forward direction)), amplitude ratio g (>1.0) becomes greater. By utilizing this relationship, prediction parameter quantizing section 22 uses fewer quantization bits so that equal quantization distortion is realized, in order to efficiently encode the inter-channel prediction parameters (delay difference D and amplitude ratio g).

Figure 3:
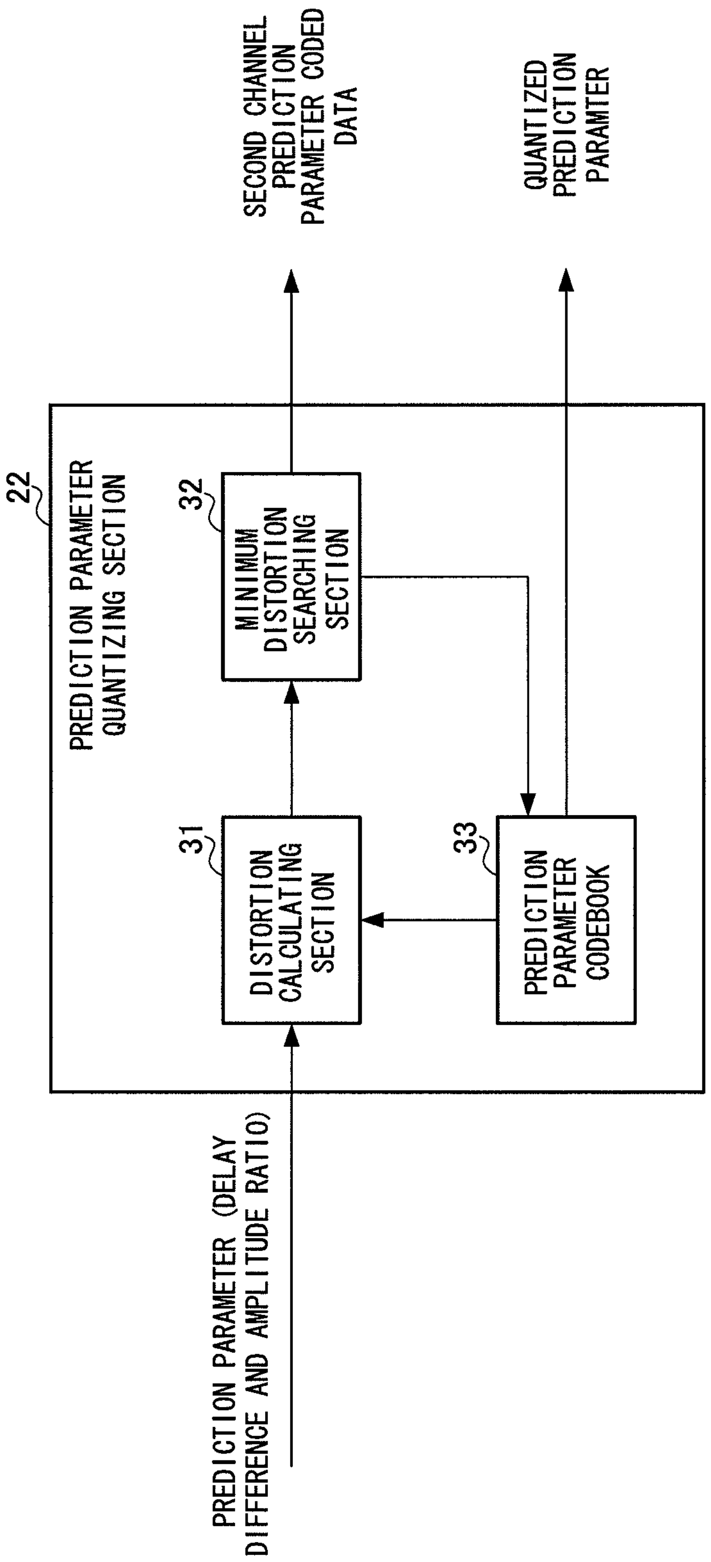
FIG. 3 is a block diagram (configuration example 1) showing a configuration of the prediction parameter quantizing section according to Embodiment 1.
Figure 5:
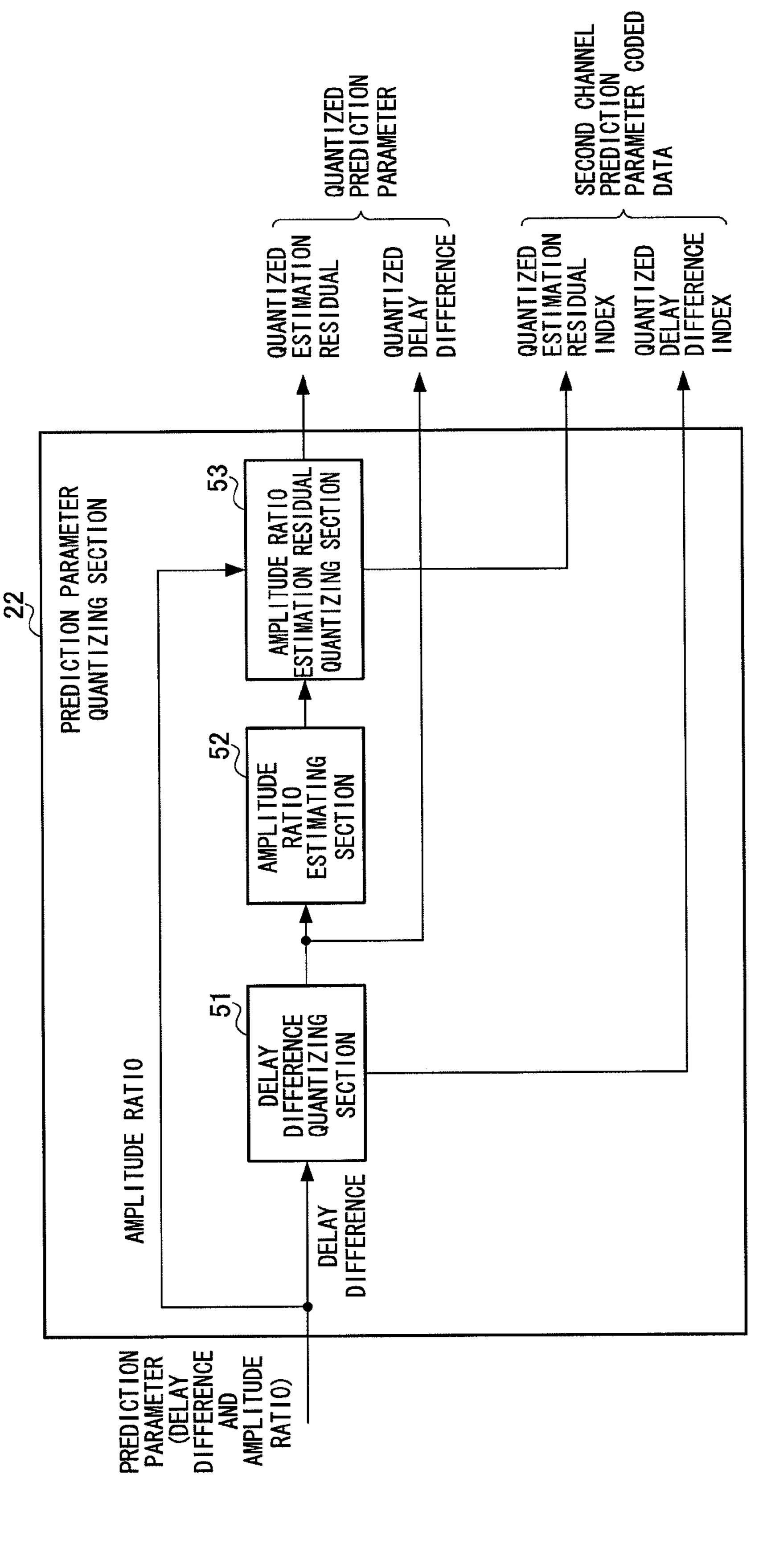
FIG. 5 is a block diagram (configuration example 2) showing a configuration of the prediction parameter quantizing section according to Embodiment 1.

The configuration of prediction parameter quantizing section 22 according to the present embodiment is as shown in <configuration example 1> of FIG. 3 or <configuration example 2> of FIG. 5.

Configuration Example 1

Figure 4:
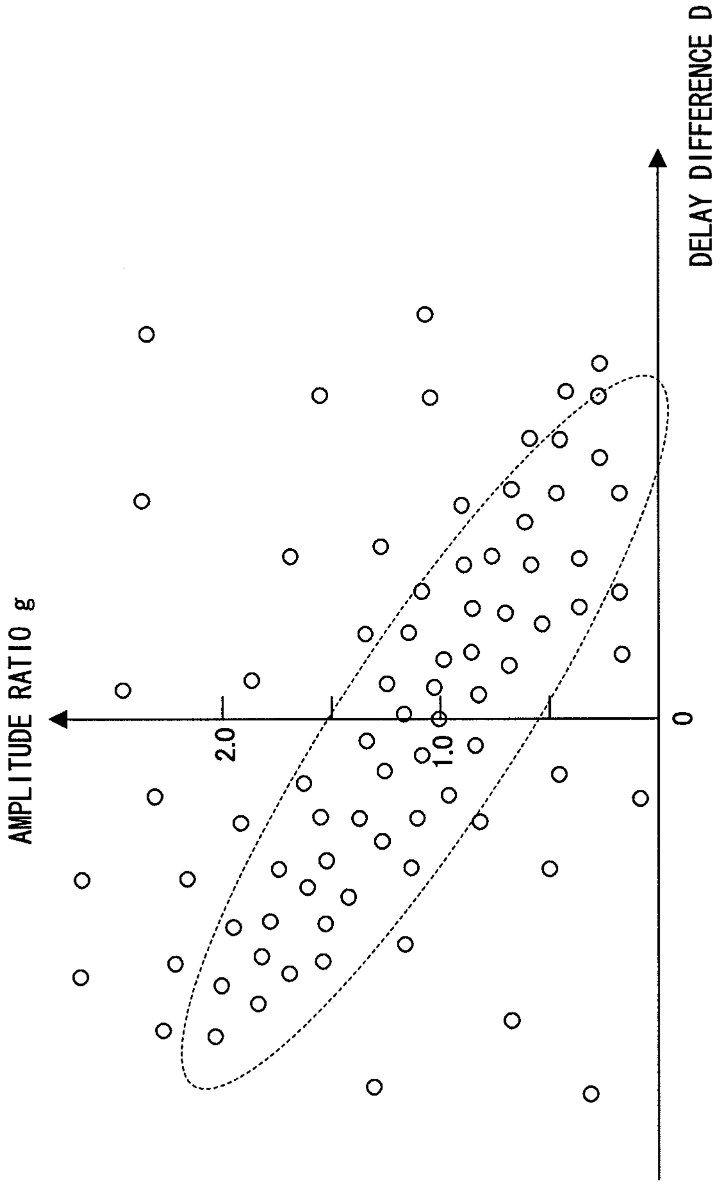
FIG. 4 shows an example of characteristics of a prediction parameter codebook according to Embodiment 1.

In configuration example 1 (FIG. 3) delay difference D and amplitude ratio g is expressed by a two-dimensional vector, and vector quantization is performed on the two dimensional vector. FIG. 4 shows characteristics of code vectors shown by circular symbol ("○") as the two-dimensional vector.

In FIG. 3, distortion calculating section 31 calculates the distortion between the prediction parameters expressed by the two-dimensional vector (D and g) formed with delay difference D and amplitude ratio g, and code vectors of prediction parameter codebook 33.

Minimum distortion searching section 32 searches for the code vector having the minimum distortion out of all code vectors, transmits the search result to prediction parameter codebook 33 and outputs the index corresponding to the code vector as second channel prediction parameter coded data.

Based on the search result, prediction parameter codebook 33 outputs the code vector having the minimum distortion as quantized prediction parameters.

Here, if the k-th vector of prediction parameter codebook 33 is (Dc(k), gc(k)) (where k is between 0 and Ncb−1 and Ncb is the codebook size), distortion Dst(k) of the k-th code vector calculated by distortion calculating section 31 is expressed by following equation 3. In equation 3, wd and wg are weighting constants for adjusting weighting between quantization distortion of the delay difference and quantization distortion of the amplitude ratio upon distortion calculation.

[3]

$$Dst(k)=wd\cdot(D-Dc(k))^2+wg\cdot(g-gc(k))^2 \quad \text{(Equation 3)}$$

Prediction parameter codebook 33 is prepared in advance by learning, based on correspondence between delay difference D and amplitude ratio g. Further, a plurality of data (learning data) indicating the correspondence between delay difference D and amplitude ratio g is acquired in advance from a stereo speech signal for learning use. There is the above relationship between the prediction parameters of the delay difference and the amplitude ratio and learning data is acquired based on this relationship. Thus, in prediction parameter codebook 33 obtained by learning, as shown in FIG. 4, the distribution of code vectors around the center of the circular symbol where delay difference D and amplitude ratio g is (D,g)=(0, 1.0) in negative proportion is dense and the other distribution is sparse. By using a prediction parameter codebook having characteristics as shown in FIG. 4, it is possible to make few quantization errors of prediction parameters which frequently occur among the prediction parameters indicating the correspondence between delay differences and amplitude ratios. As a result, it is possible to improve quantization efficiency.

Configuration Example 2

In configuration example 2 (FIG. 5), the function for estimating amplitude g from delay difference D is determined in advance, and, after delay difference D is quantized, prediction residual of the amplitude ratio estimated from the quantization value by using the function is quantized.

In FIG. 5, delay difference quantizing section 51 quantizes delay difference D out of prediction parameters, outputs this quantized delay difference Dq to amplitude ratio estimating section 52 and outputs the quantized prediction parameter. Delay difference quantizing section 51 outputs the quantized delay difference index obtained by quantizing delay difference D as second channel prediction parameter coded data.

Amplitude ratio estimating section 52 obtains the estimation value (estimated amplitude ratio) gp of the amplitude ratio from quantized delay difference Dq, and outputs the result to amplitude ratio estimation residual quantizing section 53. Amplitude ratio estimation uses a function prepared in advance for estimating the amplitude from the quantized delay difference. This function is prepared in advance by learning based on the correspondence between quantized delay difference Dq and estimated amplitude ratio gp. Further, a plurality of data indicating correspondence between quantized delay difference Dq and estimated amplitude ratio gp is obtained from stereo signals for learning use.

Amplitude ratio estimation residual quantizing section 53 calculates estimation residual δg of amplitude ratio g with respect to estimated amplitude ratio gp by using equation 4.

[4]

$$\delta g=g-gp \quad \text{(Equation 4)}$$

Amplitude ratio estimation residual quantizing section 53 quantizes estimation residual δg obtained from equation 4, and outputs the quantized estimation residual as a quantized prediction parameter. Amplitude ratio estimation residual quantizing section 53 outputs the quantized estimation residual index obtained by quantizing estimation residual δg as second channel prediction parameter coded data.

Figure 6:
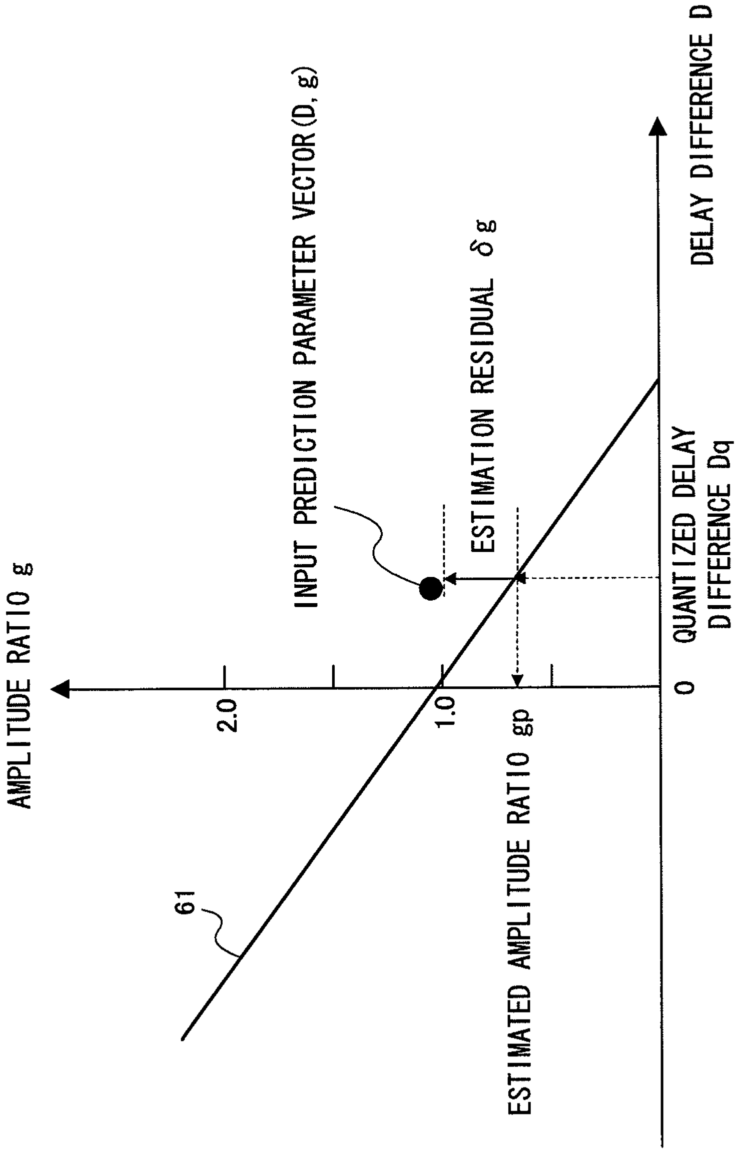
FIG. 6 shows characteristics indicating an example of the function used in the amplitude ratio estimating section according to Embodiment 1.

FIG. 6 shows an example of the function used in amplitude ratio estimating section 52. Inputted prediction parameters (D,g) are indicated as a two-dimensional vector by circular symbols on the coordinate plane shown in FIG. 6. As shown in FIG. 6, function 61 for estimating the amplitude ratio from the delay difference is in negative proportion such that function 61 passes the point (D,g)=(0,1.0) or its vicinity. Further, amplitude ratio estimating section 52 obtains estimated amplitude ratio gp from quantized delay difference Dq by using this function. Moreover, amplitude ratio estimation residual quantizing section 53 calculates the estimation residual δg of amplitude ratio g of the input prediction parameter with respect to estimated amplitude ratio gp, and quantizes this estimation residual δg. In this way, by quantizing estimation residual, it is possible to further reduce quantization error than directly quantizing the amplitude ratio, and, as a result, improve quantization efficiency.

A configuration has been described in the above description where estimated amplitude ratio gp is calculated from quantized delay difference Dq by using function for estimating the amplitude ratio from the quantized delay difference, and estimation residual δg of input amplitude ratio g with respect to this estimated amplitude ratio gp is quantized. However, a configuration may be possible that quantizes input amplitude ratio g, calculates estimated delay difference Dp from quantized amplitude ratio gq by using the function for estimating the delay difference from the quantized amplitude ratio and quantizes estimation residual δD of input delay difference D with respect to estimated delay difference Dp.

Embodiment 2

The configuration of prediction parameter quantizing section 22 (FIG. 2, FIG. 3 and FIG. 5) of the speech coding apparatus according to the present embodiment differs from prediction parameter quantizing section 22 of Embodiment 1. In quantizing prediction parameters in the present embodiment, a delay difference and an amplitude ratio are quantized such that quantization errors of parameters of both the delay difference and the amplitude ratio perceptually cancel each other. That is, when a quantization error of a delay difference occurs in the positive direction, quantization is carried out such that quantization error of an amplitude ratio becomes larger. On the other hand, when quantization error of a delay difference occurs in the negative direction, quantization is carried out such that quantization error of an amplitude ratio becomes smaller.

Here, human perceptual characteristics make it possible to adjust the delay difference and the amplitude ratio mutually in order to achieve the localization of the same stereo sound. That is, when the delay difference becomes more significant than the actual delay difference, equal localization can be achieved by increasing the amplitude ratio. In the present embodiment, based on the above perceptual characteristic, the delay difference and the amplitude ratio are quantized by adjusting quantization error of the delay difference and quantization error of the amplitude ratio, such that the localization of stereo sound does not change. As a result, efficient coding of prediction parameters is possible. That is, it is possible to realize equal sound quality at lower coding bit rates and higher sound quality at equal coding bit rates.

Figure 7:
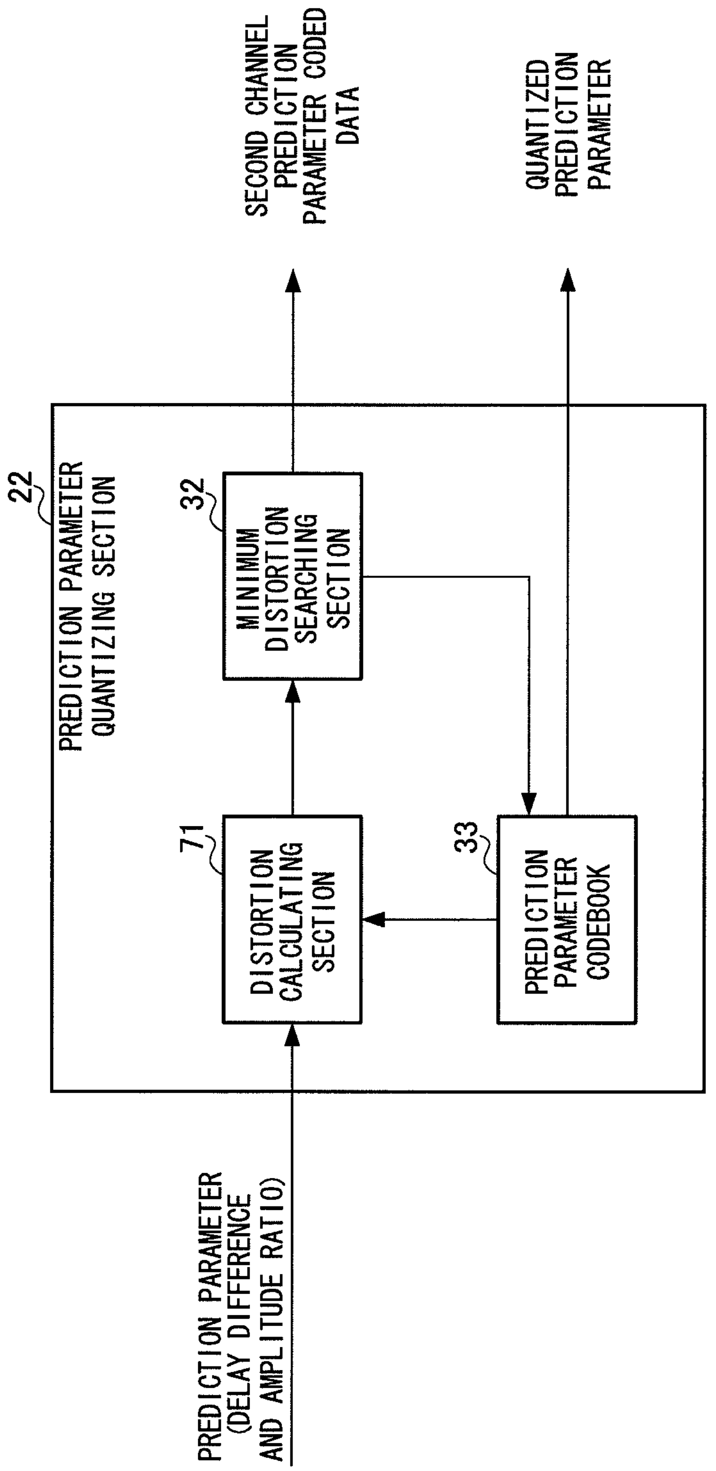
FIG. 7 is a block diagram (configuration example 3) showing a configuration of the prediction parameter quantizing section according to Embodiment 2.
Figure 9:
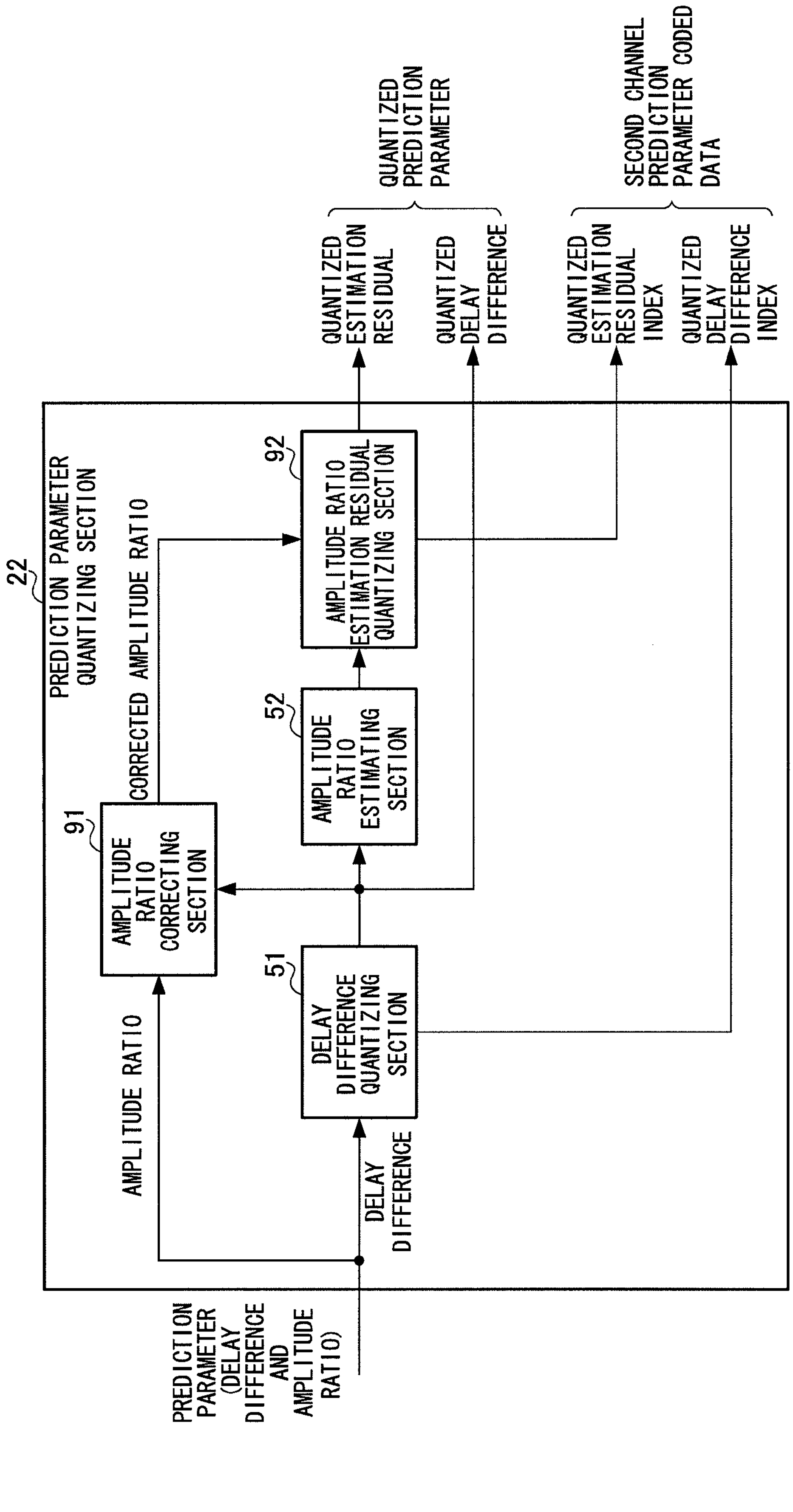
FIG. 9 is a block diagram (configuration example 4) showing a configuration of the prediction parameter quantizing section according to Embodiment 2.

The configuration of prediction parameter quantizing section 22 according to the present embodiment is as shown in <configuration example 3> of FIG. 7 or <configuration example 4> of FIG. 9.

Configuration Example 3

The calculation of distortion in configuration example 3 (FIG. 7) is different from configuration 1 (FIG. 3). In FIG. 7, the same components as in FIG. 3 are allotted the same reference numerals and description thereof will be omitted.

In FIG. 7, distortion calculating section 71 calculates the distortion between the prediction parameters expressed by the two-dimensional vector (D,g) formed with delay difference D and amplitude ratio g, and code vectors of prediction parameter codebook 33.

The k-th vector of prediction parameter codebook 33 is set as (Dc(k),gc(k)) (where k is between 0 and Ncb and Ncb is the codebook size). Distortion calculating section 71 moves the two-dimensional vector (D,g) for the inputted prediction parameters to the perceptually closest equivalent point (Dc'(k),gc'(k)) to code vectors (Dc(k),gc(k)), and calculates distortion Dst(k) according to equation 5. In equation 5, wd and wg are weighting constants for adjusting weighting between quantization distortion of the delay difference and quantization distortion of the amplitude ratio upon distortion calculation.

[5]

$$Dst(k)=wd\cdot((Dc'(k)-Dc(k))^2+wg\cdot(gc'(k)-gc(k))^2 \quad \text{(Equation 5)}$$

Figure 8:
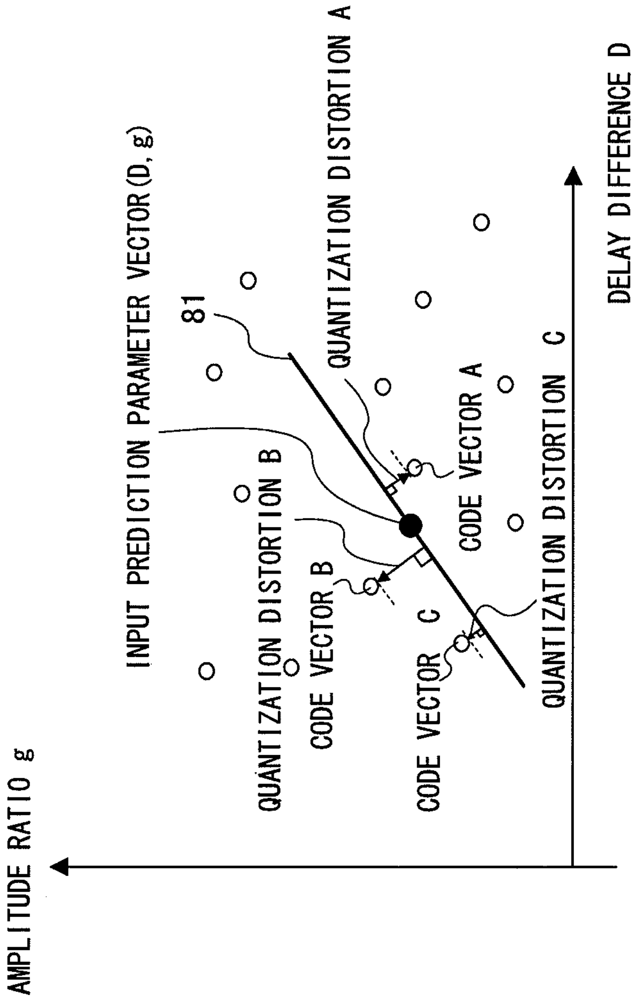
FIG. 8 shows characteristics indicating an example of the function used in the distortion calculating section according to Embodiment 2.

As shown in FIG. 8, the perceptually closest equivalent point to code vectors (Dc(k),gc(k)) corresponds to the point to which a perpendicular goes from the code vectors vertically down to function 81 having the set of stereo sound localization perceptually equivalent to the input prediction parameter vector (D,g). This function 81 places delay difference D and amplitude ratio g in proportion to each other in the positive direction. That is, this function 81 has a perceptual characteristic of achieving perceptually equivalent localization by making the amplitude ratio greater when the delay difference becomes greater and making the amplitude ratio smaller when the delay difference becomes smaller.

When input prediction parameter vector (D,g) is moved to the perceptually closest equivalent point to the code vectors (Dc(k),gc(k)) in function 81, a penalty is imposed by making the distortion larger with respect to the move to the point across far over the predetermined distance.

When vector quantization is carried out using distortion obtained in this way, for example, in FIG. 8, instead of code vector A (quantization distortion A) which is closest to the input prediction parameter vector or code vector B (quantization distortion B), code vector C (quantization distortion C) stereo sound localization which is perceptually closer to the input prediction parameter vector becomes the quantization value. Thus, it is possible to carry out quantization with fewer perceptual distortion.

Configuration Example 4

Configuration example 4 (FIG. 9) differs from configuration example 2 (FIG. 5) in quantizing the estimation residual of the amplitude ratio which is corrected to a perceptually equivalent value (corrected amplitude ratio) taking into account the quantization error of the delay difference. In FIG. 9, the same components as in FIG. 5 are assigned the same reference numerals and description thereof will be omitted.

In FIG. 9, delay difference quantizing section 51 outputs quantized delay difference Dq to amplitude ratio correcting section 91.

Amplitude ratio correcting section 91 corrects amplitude ratio g to a perceptually equivalent value taking into account quantization error of the delay difference, and obtains corrected amplitude ratio g'. This corrected amplitude ratio g' is inputted to amplitude ratio estimation residual quantizing section 92.

Amplitude ratio estimation residual quantizing section 92 obtains estimation residual δg of corrected amplitude ratio g' with respect to estimated amplitude ratio gp according to equation 6.

[6]

$$\delta g=g'-gp \quad \text{(Equation 6)}$$

Amplitude ratio estimation residual quantizing section 92 quantizes estimated residual δg obtained according to equation 6, and outputs the quantized estimation residual as the quantized prediction parameters. Amplitude ratio estimation residual quantizing section 92 outputs the quantized estimation residual index obtained by quantizing estimation residual δg as second channel prediction parameter coded data.

Figure 10:
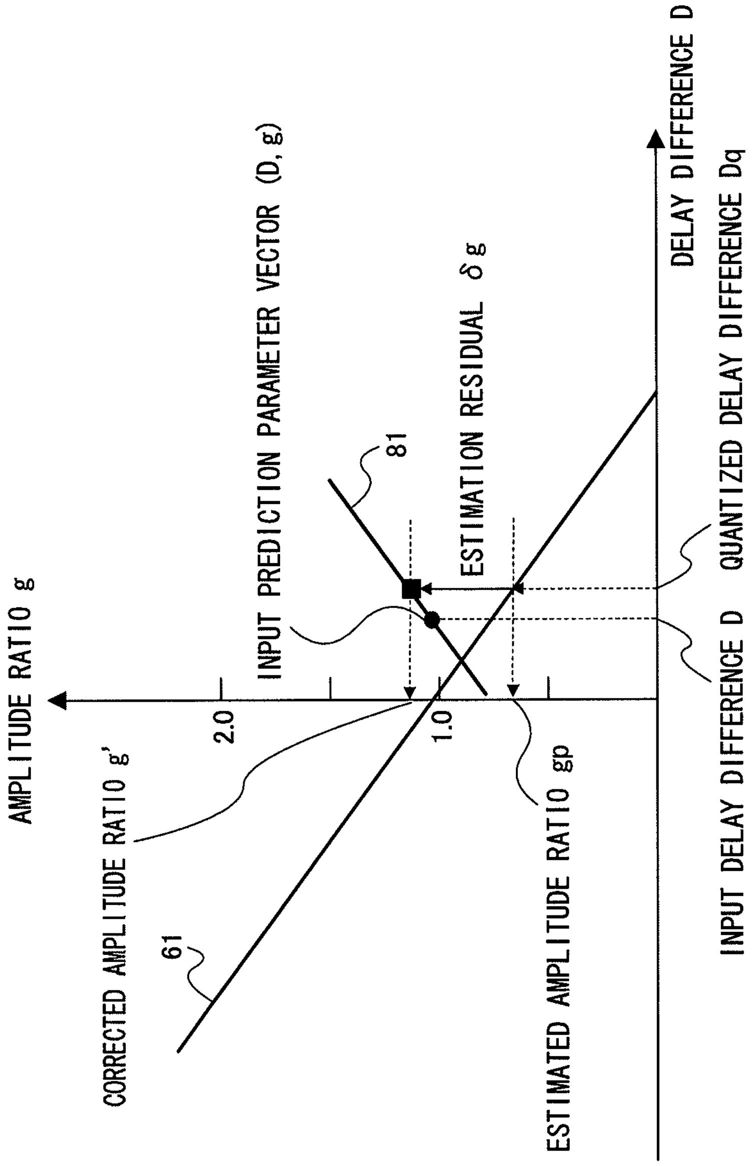
FIG. 10 shows characteristics indicating an example of the functions used in the amplitude ratio correcting section and the amplitude ratio estimating section according to Embodiment 2.

FIG. 10 shows examples of the functions used in amplitude ratio correcting section 91 and amplitude ratio estimating section 52. Function 81 used in amplitude ratio correcting section 91 is the same as function 81 used in configuration example 3. Function 61 used in amplitude ratio estimating section 52 is the same as function 61 used in configuration example 2.

As described above, function 81 places delay difference D and amplitude ratio g in proportion in the positive direction. Amplitude ratio correcting section 91 uses this function 81 and obtains corrected amplitude ratio g' that is perceptually equivalent to amplitude ratio g taking into account the quantization error of the delay difference, from quantized delay difference. As described above, function 61 is a function which includes a point (D,g)=(0,1.0) or its vicinity and has inverse proportion. Amplitude ratio estimating section 52 uses this function 61 and obtains estimated amplitude ratio gp from quantized delay difference Dq. Amplitude ratio estimation residual quantizing section 92 calculates estimation residual δg of corrected amplitude ratio g' with respect to estimated amplitude ratio gp, and quantizes this estimation residual δg.

Thus, estimation residual is calculated from the amplitude ratio which is corrected to a perceptually equivalent value (corrected amplitude ratio) taking into account the quantization error of delay difference, and the estimation residual is quantized, so that it is possible to carry out quantization with perceptually small distortion and small quantization error.

Configuration Example 5

Figure 11:
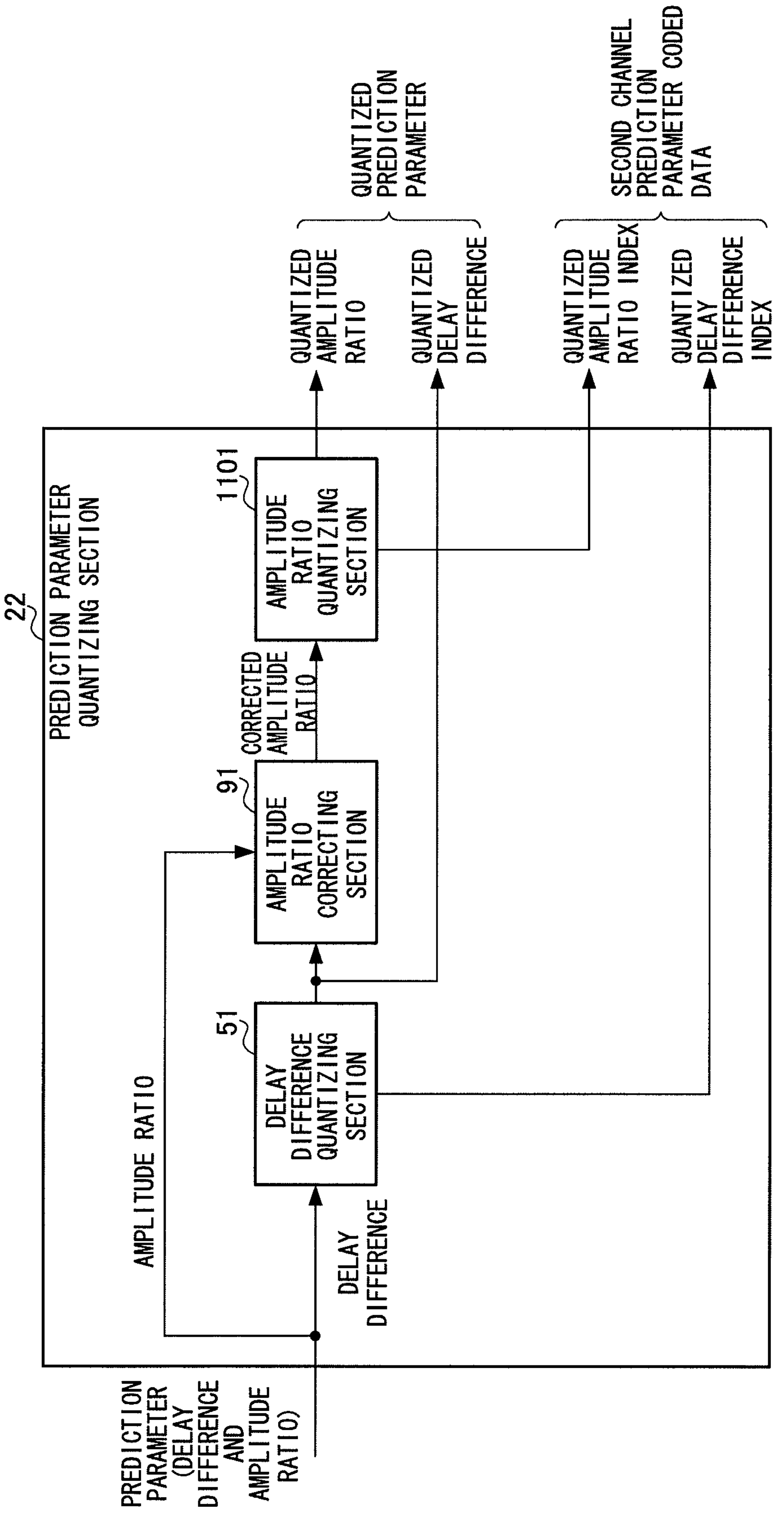
FIG. 11 is a block diagram (configuration example 5) showing a configuration of the prediction parameter quantizing section according to Embodiment 2.

When delay difference D and amplitude ratio g are separately quantized, the perceptual characteristics with respect to the delay difference and the amplitude ratio may be used as in the present embodiment. FIG. 11 shows the configuration of prediction parameter quantizing section 22 in this case. In FIG. 11, the same components as in configuration example 4 (FIG. 9) are allotted the same reference numerals.

In FIG. 11, as in configuration example 4, amplitude ratio correcting section 91 corrects amplitude ratio g to a perceptually equivalent value taking into account the quantization error of the delay difference, and obtains corrected amplitude ratio g'. This corrected amplitude ratio g' is inputted to amplitude ratio quantizing section 1101.

Amplitude ratio quantizing section 1101 quantizes corrected amplitude ratio g' and outputs the quantized amplitude ratio as a quantized prediction parameter. Further, amplitude ratio quantizing section 1101 outputs the quantized amplitude ratio index obtained by quantizing corrected amplitude ratio g' as second channel prediction parameter coded data.

In the above embodiments, the prediction parameters (delay difference D and amplitude ratio g) are described as scalar values (one-dimensional values). However, a plurality of prediction parameters obtained over a plurality of time units (frames) may be expressed by the two or more-dimension vector, and then subjected to the above quantization.

Further, the above embodiments can be applied to a speech coding apparatus having a monaural-to-stereo scalable configuration. In this case, at a monaural core layer, a monaural signal is generated from an input stereo signal (first channel and second channel speech signals) and encoded. Further, at a stereo enhancement layer, the first channel (or second channel) speech signal is predicted from the monaural signal using inter-channel prediction, and a prediction residual signal of this predicted signal and the first channel (or second channel) speech signal is encoded. Further, CELP coding may be used in encoding at the monaural core layer and stereo enhancement layer. In this case, at the stereo enhancement layer, the monaural excitation signal obtained at the monaural core layer is subjected to inter-channel prediction, and the prediction residual is encoded by CELP excitation coding. In a scalable configuration, inter-channel prediction parameters refer to parameters for prediction of the first channel (or second channel) from the monaural signal.

When the above embodiments are applied to speech coding apparatus having monaural-to-stereo scalable configurations, delay differences (Dm1 and Dm2) and amplitude ratios (gm1 and gm2) of the first channel and the second channel speech signal of the monaural signal may be collectively quantized as in Embodiment 2. In this case, there is correlation between delay differences (between Dm1 and Dm2) and amplitude ratios (between gm1 and gm2) of channels, so that it is possible to improve coding efficiency of prediction parameters in the monaural-to-stereo scalable configuration by utilizing the correlation.

The speech coding apparatus and speech decoding apparatus of the above embodiments can also be mounted on radio communication apparatus such as wireless communication mobile station apparatus and radio communication base station apparatus used in mobile communication systems.

Also, cases have been described with the above embodiments where the present invention is configured by hardware. However, the present invention can also be realized by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese patent application No. 2005-088808, filed on Mar. 25, 2005, the entire content of which is expressly incorporated by reference herein.

INDUSTRIAL APPLICABILITY

The present invention is applicable to uses in the communication apparatus of mobile communication systems and packet communication systems employing Internet protocol.

The invention claimed is:

1. A speech coding apparatus, comprising:

a prediction parameter analyzer that calculates a delay difference and an amplitude ratio between a first sound signal and a second sound signal as prediction parameters; and a quantizer, implemented via a processor of the speech coding apparatus, that calculates quantized prediction parameters from the prediction parameters based on a relationship between the delay difference and the amplitude ratio, wherein said quantizer calculates the quantized prediction parameters by one of quantizing a residual of the amplitude ratio with respect to an amplitude ratio estimated from the delay difference or quantizing a residual of the delay difference with respect to a delay difference estimated from the amplitude ratio.

2. The speech coding apparatus according to claim 1, wherein said quantizer calculates the quantized prediction parameters by carrying out quantization such that a quantization error of the delay difference and a quantization error of the amplitude ratio occur in a direction where the quantization error of the delay difference and the quantization error of the amplitude ratio perceptually cancel each other.

3. The speech coding apparatus according to claim 1, wherein said quantizer calculates the quantized prediction parameters using a two-dimensional vector comprised of the delay difference and the amplitude ratio.

4. A wireless communication mobile station apparatus comprising the speech coding apparatus according to claim 1.

5. A wireless communication base station apparatus comprising the speech coding apparatus according to claim 1.

6. A speech coding method, comprising:

calculating a delay difference and an amplitude ratio between a first sound signal and a second sound signal as a prediction parameter; and calculating, using a processor of a speech coding apparatus, quantized prediction parameters from the prediction parameters based on a relationship between the delay difference and the amplitude ratio, wherein said quantized prediction parameters are calculated by one of quantizing a residual of the amplitude ratio with respect to an amplitude ratio estimated from the delay difference or quantizing a residual of the delay difference with respect to a delay difference estimated from the amplitude ratio.

7. A speech coding apparatus for coding stereophonic sound, comprising:

a prediction parameter analyzer that determines a delay difference and an amplitude ratio of a first-channel sound signal with respect to a second-channel sound signal as prediction parameters from a first-channel decoded signal and a second-channel sound signal; and a prediction parameter quantizer, implemented via a processor of the speech coding apparatus, that quantizes the prediction parameters by encoding and quantizing the prediction parameters based on using a relationship between the delay difference and the amplitude ratio attributed to a spatial characteristic from a sound source of the second-channel signal to a receiving point, wherein said prediction parameter quantizer calculates the quantized prediction parameters by one of quantizing a residual of the amplitude ratio with respect to an amplitude ratio estimated from the delay difference or quantizing a residual of the delay difference with respect to a delay difference estimated from the amplitude ratio.

8. The speech coding apparatus according to claim 7, wherein said prediction parameter quantizer calculates the quantized prediction parameters by carrying out quantization such that a quantization error of the delay difference and a quantization error of the amplitude ratio occur in a direction where the quantization error of the delay difference and the quantization error of the amplitude ratio perceptually cancel each other.

9. The speech coding apparatus according to claim 7, wherein said prediction parameter quantizer calculates the quantized prediction parameters using a two-dimensional vector comprised of the delay difference and the amplitude ratio.

10. A wireless communication mobile station apparatus comprising the speech coding apparatus of claim 7.

11. A wireless communication base station apparatus comprising the speech coding apparatus of claim 7.

12. A speech coding apparatus, comprising:

a prediction parameter analyzer that calculates a delay difference and an amplitude ratio between a first sound signal and a second sound signal as prediction parameters;

a quantizer, implemented via a processor of the speech coding apparatus, that calculates quantized prediction parameters from the prediction parameters based on a relationship between the delay difference and the amplitude ratio; and a signal predictor that predicts a second-channel signal using a first decoded signal and the quantized prediction parameters, wherein said quantizer calculates the quantized prediction parameters by one of quantizing a residual of the amplitude ratio with respect to an amplitude ratio estimated from the delay difference or quantizing a residual of the delay difference with respect to a delay difference estimated from the amplitude ratio.

13. A speech coding method, comprising:

calculating a delay difference and an amplitude ratio between a first sound signal and a second sound signal as a prediction parameter;

calculating, using a processor of a speech coding apparatus, quantized prediction parameters from the prediction parameters based on a relationship between the delay difference and the amplitude ratio; and predicting a second-channel signal using a first decoded signal and the quantized prediction parameters, wherein said quantized prediction parameters are calculated by one of quantizing a residual of the amplitude ratio with respect to an amplitude ratio estimated from the delay difference or quantizing a residual of the delay difference with respect to a delay difference estimated from the amplitude ratio.

* * * * *